Nov. 3, 1959  H. D. PAXTON  2,910,698
TOOL NOSE WITH T-NAIL CENTRALIZER
Filed Aug. 26, 1957

Harold D. Paxton
INVENTOR.

BY

2,910,698
TOOL NOSE WITH T-NAIL CENTRALIZER

Harold D. Paxton, Visalia, Calif., assignor to Calwire, Visalia, Calif., a corporation of California Application August 26, 1957, Serial No. 680,346

10 Claims. (Cl. 1—46)

This invention relates to fastener driving tools and more particularly to a centralizer for the nosepiece of a power operated fastener driver.

I have been made aware of pneumatic fastener driver tools that have nosepieces provided with fastener stabilizers. In one instance the fastener stabilizer is constructed especially for staples and is pivoted, necessitating the generation of a hinge moment during each staple driving cycle.

Other staple stabilizers utilize different mechanical organizations in attempting to achieve a smooth operation for their tools by presenting the fasteners to the blade in the same disposition for each cycle of operation of the driver blade.

An object of this invention is to provide a new centralizer for fasteners in the nosepiece of a power operated tool which has a movable blade to propel the fasteners from the nosepiece. The nature and substance of the invention involves a fully floating centralizer as opposed to stabilizers which are mechanically connected in any way to a part of the fastener driver. In the case where a pivotal movement is used, unwanted hinge moments are generated each time that the driver blade is actuated. Moreover, there must be a precision dimension across the channel at the hinge axis to enable the fasteners to pass through the channel. Any irregularities in fastener thickness reduces the efficiency in the operation of the tool should the irregularity in thickness be sufficient to cause binding.

A further object of this invention is to provide a centralizer in a nosepiece of a fastener driver, the centralizer being fully floating and spring pressed to the inward position with respect to the fastener and fastener driver blade channel. In this way very close tolerances are not necessary since the centralizer is fully displaceable that is, it is completely disconnected by hinge connections or the like so that the entire body of the centralizer is capable of deflection against the yielding opposition of the spring.

Another object of the invention is to provide a fastener driver nosepiece with a fully floating centralizer for the fasteners, this centralizer located in an opening in the channel of the nosepiece and formed with an elongate groove that has side walls including a dihedral angle therebetween and a cam surface at one end thereof, the fasteners being fed, for example from a magazine, into the nosepiece at a plate laterally opposed from the centralizer so that the fasteners are fed directly into the groove. It is preferred, although not essential, that the type of fastener have a shank and a head with the arrangement being such that the head is fed between the cam surface on the centralizer and the driving end of the blade so that the shank fits flush within the groove of the centralizer. The width of the centralizer is smaller than the width of the driver blade so that in a single cycle of operation the head of the fastener is propelled up the cam surface thereby deflecting the entire centralizer, and the blade completely spans the centralizer passing over the cam surface and the front surface of the centralizer. This action of the blade on the centralizer holds the centralizer deflected while the next fastener is fed against the outer surface of the blade. During retraction of the blade, the blade is pulled from beneath the fastener at the leading end of the fastener enabling the fastener to fit within the groove of the centralizer and progressively, as the blade is withdrawn, the remainder of the length of the fastener fits nested within the groove with the head of the fastener located between the cam surface of the centralizer and the end of the blade. At this time the spring has returned the centralizer to the full inward position with respect to the channel in the nosepiece, holding the subsequent fastener within the channel and in correct alignment with the blades so that the fastener can be driven from the channel during a subsequent cycle of blade operation.

In my tool nosepiece the channel and the blade that operates in the channel, are of uniform width throughout their length so that there is no possibility of binding between shoulders or reductions or enlargements in width as would be occasioned by broken fasteners lodging in the nosepiece or by misalignment. The dimensions of the centralizer are such that it fits in an opening in the bottom wall of the channel and has the blade operable over the bottom surface of the centralizer. Note that the blade does not enter any part of the centralizer. Rather, it wipes the fastener that is in the centralizer groove from the centralizer and propels it rapidly and accurately. By virtue of this clean construction there is considerably less likelihood of the tool becoming jammed. Moreover, the tolerance requirement is lower than that wherein there are a number of shoulders and parts fitting into slots. Yet, the original smoothness of operation is preserved over long periods of operation. A further advantage in this clean construction and the full floating of the centralizer, is its rapidity in handling fasteners. Comparatively high speed operation is much more easily achieved.

Other objects and features of importance will become apparent in following the description of the illustrated form of the invention.

Figure 1:
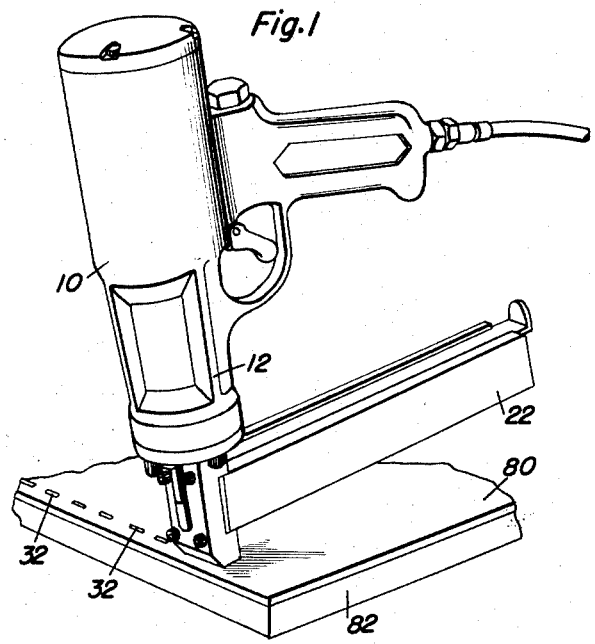
Figure 1 is a perspective view of a fastener driver equipped with the nosepiece and centralizer in the nosepiece of the invention.
Figure 5:
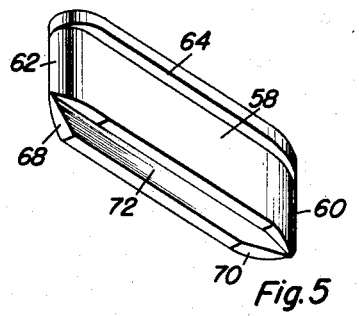
Figure 5 is a perspective view of the centralizer body.

In the accompanying drawing there is a fastener driver which, for the purpose of illustration, is a pneumatic hammer 10. It consists of a frame 12 accommodating various structure and devices which actuate the flat driver blade 14 in a reciprocatory path of travel. Blade 14 is rectangular in cross-section and of uniform cross-sectional shape. Nosepiece 16 has a mounting flange 18 which fits against the extremity of frame 12 and which is held in place by bolts 20 passed through holes in mounting flange 18 and threaded into tapped holes in the end of frame 12.

Magazine 22 or some other means for feeding fasteners, is attached to the nosepiece 16 by bolts 24. The discharge end of magazine 22 fits between shoulders 26 and 28 of the nosepiece and on one side of it. The space between shoulders 26 and 28 defines an opening within which the discharge end of magazine 22 is fitted flush against the surface 30 of the nosepiece.

The fasteners 32 capable of being handled by pneumatic hammer 10 may be altered in their shape, size and kind. The preferred fastener for the embodiment that is illustrated, is a nail having a shank 34 and a head 36. Head 36 is in the form of a cross piece fixed to one end of the shank 34, the other end of the shank being pointed either sharp or blunt. Head 36 being a cross piece, is arranged with the shank 34 to form a T-shaped nail.

Figure 4:
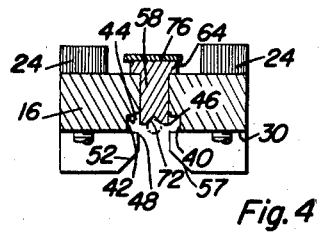
Figure 4 is a transverse sectional view taken on the line 4—4 of Figure 3 and showing principally the position of the centralizer within the blade channel of the nosepiece.
Figure 3:
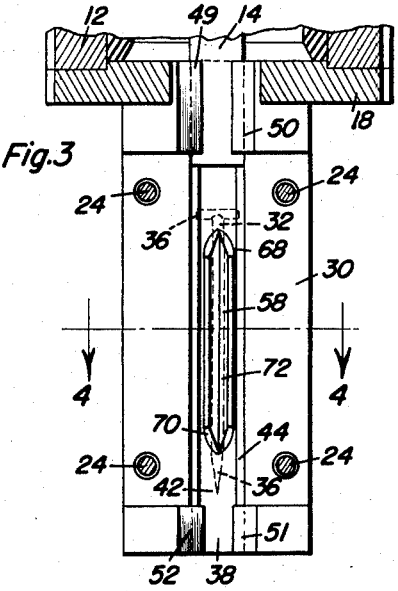
Figure 3 is a sectional view taken on the line 3—3 of Figure 2.

There is an elongaated longitudinal channel 38 which is open at both ends. Channel 38 receives blade 14, guiding it in its operation, and receives the fasteners that are fed from magazine 22. The channel has sides 40 and 42 (Figure 4) and a bottom wall 44. An elongated recess 46 is formed in the bottom wall and opens toward the magazine 22. This elongated recess separates the bottom wall into a pair of lands or shoulders on which the lateral edges of blade 14 seat during all phases of operation of the fastener driver. The final wall 48 of the channel is parallel to the bottom wall 44 and is formed in four fragments 49, 50, 51 and 52 (Figure 3) separated by the recess which accommodates the discharge end of the magazine 22.

Nosepiece 16 has an opening 56 within which centralizer 58 is disposed. The opening is through the bottom wall 44 enabling a part of the centralizer to enter the channel 42 and come within the path of travel of driver blade 14. Centralizer 58 is constructed of an elongated body with rounded ends 60 and 62 which fit within the rounded ends of opening 56. The centralizer is fully floating within the opening 56 and completely mechanically disconnected from it. Flange 64 is along one edge of the body of the centralizer and bears against an outer surface of the nosepiece to form means to limit the inward penetration of the centralizer. Cam surfaces 68 and 70 are formed at the ends of the part of the centralizer which fits within the channel so that the centralizer is interchangeable, end for end, within the opening 56. An elongate groove 72 having planar side walls include a dihederal angle, is formed in the part of the centralizer in the channel 42 so that the shank 34 of a typical fastener 32 can nest in the centralizer.

The only means which, in the preferred embodiment, exercise restraint over the free motion of the centralizer, is a flat spring 76 that has one end attached by one of the bolts 20 to the nosepiece and the frame 12. The inherent elasticity of spring 76 presses the centralizer yieldingly inwardly of channel 42, however, the centralizer is capable of being deflected outwardly of the channel by the movement of the fastener and the fastener driving blade 14 in the normal cycles of operation of the tool.

As shown in Figure 1 the use of a tool which includes a nosepiece and centralizer in accordance with the invention, is the same as tools of the same general class as the tool 10. Panel 80 is shown being fastened to a frame 82, however, this schematically represents any kind of reasonable operation for tool 10.

Figure 2:
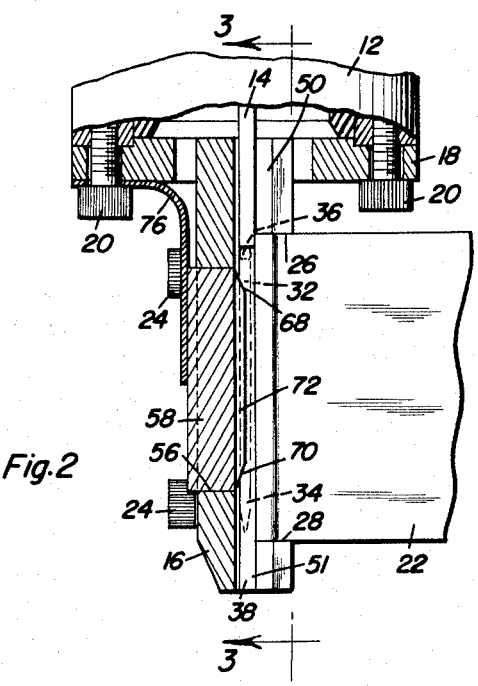
Figure 2 is a longitudinal sectional view of the nosepiece and a part of the frame of the tool and fastener feeding magazine of Figure 1.

In preparing tool 10 for use, the magazine 22 is loaded with fasteners and it is retained in place on the nosepiece so that the discharge end of the magazine feeds laterally into channel 42 and at a point opposite to the opening 56 and centralizer 58 held fully floating in that opening. When magazine 22 is of the spring loaded type, the fasteners are spring pressed into the channel with the outermost fastener forced into the propulsion station of the nosepiece. This position is defined as that wherein the shank 34 of the fastener is disposed in the groove 42 and head 36 is between the cam surfaces 68 and the end of the blade 14 (Figure 2). The elasticity of spring 76 is sufficient to hold the fastener in place in front of the driver blade 14. Then, when the blade 14 is propelled toward the head 36 it rides on the shoulders of the bottom wall 44 of the channel. As blade 14 first moves, it pushes against the head 36 of the fastener, causing it to contact cam surface 68. Immediately thereafter the outer end of blade 14 contacts the cam surface 68 and the fastener head and the blade 14 deflects the centralizer 58 constrained only by the shape of the opening 56 and by the spring 76. After driving the fastener in this way, the blade 14 is withdrawn enabling a subsequent fastener to be fed from magazine 22 laterally into the channel at a position opposite to the centralizer 58. The outer end of the fastener first fits in the groove 72 and as the blade continues to withdraw into the frame 12, the remainder of the fastener becomes nested in the centralizer groove with the head located between cam surface 68 and the driving end of blade 14. In this condition, the tool is prepared for another cycle of operation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a fastener driver which has a nosepiece provided with a channel and having a driver blade to propel the fasteners from the nosepiece, a fastener centralizer for locating the fasteners in the path of travel of said blade, said centralizer being free floating in the nosepiece along all of its edges, and elastic means for yieldingly holding the centralizer in a rest position until deflected by said blade when the blade is in a fastener driving stroke, said centralizer having an elongated groove with flat side walls arranged to include a fastener receiving dihedral angle.

2. In a pneumatic fastener driver having a frame supporting a fastener propelling blade, the improvement comprising a nosepiece that has a channel in which said blade is reciprocable, means in lateral registry with said channel for feeding fasteners into said channel and in the path of travel of the blade, said channel having a lateral opening opposing said feeding means, a fully floating centralizer bodily displaceably mounted in said opening, and means operatively connected with said centralizer to constrain the movement of said fully floating centralizer.

3. In a pneumatic fastener driver having a frame supporting a fastener propelling blade, the improvement comprising a nosepiece that has a channel in which said blade is reciprocable, means in lateral registry with said channel for feeding fasteners into said channel and in the path of travel of the blade, said channel having a lateral opening opposing said feeding means, a fully floating centralizer bodily displaceably mounted in said opening, means operatively connected with said centralizer to constrain the movement of said fully floating centralizer, said centralizer having a fastener aligning groove and an exterior surface over which said blade slides when said blade moves through its driving stroke.

4. In a power operated fastener driver that has a frame, a blade movably carried by said frame, a nosepiece having a blade travelling channel with sides and a bottom wall, means to feed fasteners laterally into said channel for driving by said blade, said channel having an opening in said bottom wall, a fastener centralizer to uniformly position the fasteners in said channel for subsequent propulsion by said blade, said centralizer located in said opening and completely mechanically separate and disconnected from the nosepiece so that said centralizer is fully freely floating in said opening, a spring reacting on said centralizer and yieldingly urging the centralizer inwardly of said channel to a position between said channel sides, and means limiting the extent of penetration of said centralizer into said channel.

5. In a power operated fastener driver that has a frame, a blade movably carried by said frame, a nosepiece having a blade travelling channel with sides and a bottom wall, means to feed fasteners laterally into said channel for driving by said blade, said channel having an opening in said bottom wall, a fastener centralizer to uniformly position the fasteners in said channel for subsequent propulsion by said blade, said centralizer located in said opening and completely mechanically separate and disconnected from the nosepiece so that said centralizer is fully freely floating in said opening, said centralizer having a cam surface at one end over which the fasteners are adapted to be driven by said blade, and the part of said centralizer which is located in said channel being narrower than said blade so that said blade spans the centralizer when driving the fasteners that are driven over said cam surface and from the groove in said centralizer.

6. In a power operated fastener driver that has a frame, a blade movably carried by said frame, a nosepiece having a blade travelling channel with sides and a bottom wall, means to feed fasteners laterally into said channel for driving by said blade, said channel having an opening in said bottom wall, a fastener centralizer to uniformly position the fasteners in said channel for subsequent propulsion by said blade, said centralizer located in said opening and completely mechanically separated and disconnected from the nosepiece so that said centralizer is fully freely floating in said opening, a spring reacting on said centralizer and yieldingly urging the centralizer inwardly of said channel to a position between said channel sides, and means limiting the extent of penetration of said centralizer into said channel, said centralizer having a cam surface at one end over which the fasteners are adapted to be driven by said blade, and the part of said centralizer which is located in said channel being narrower than said blade so that said blade spans the centralizer when driving the fasteners that are driven over said cam surface and from the groove in said centralizer and thereby deflecting said centralizer in said opening against the yielding opposition of said spring.

7. A nosepiece for the reciprocating blade of a fastener driving tool, said nosepiece having a mounting flange by which to attach to the tool, a longitudinal channel provided with sides and a bottom wall and within which the blade is reciprocable, means for attaching a fastener supply feeding device to the nosepiece so that the fasteners are fed into the channel and into the path of travel of the blade, a centralizer for the fasteners and comprising a centralizer body, said nosepiece having an opening within which said centralizer body is disposed, a part of said centralizer body extending into said channel and having a groove to accept fasteners from the fastener feeding device and locate the fasteners directly in the path of travel of said blade, said centralizer being freely floating in said opening and mechanically disconnected from said channel, a spring reacting on said centralizer body and urging said centralizer body inwardly of said channel, and means for limiting the extent of penetration of said centralizer body into said channel.

8. The combination of claim 7 wherein said means limiting the movement of said centralizing body inwardly of said channel comprises a stop flange, and said groove of the part of said centralizer body that is located in said channel having planar side walls arranged to include a fastener receiving dihedral angle between them.

9. A nosepiece for the reciprocating blade of a fastener driving tool, said nosepiece having a mounting flange by which to attach to the tool, a longitudinal channel provided with sides and a bottom wall and within which the blade is reciprocable, means for attaching a fastener supply feeding device to the nosepiece so that the fasteners are fed into the channel and into the path of travel of the blade, a centralizer for the fasteners and comprising a centralizer body, said nosepiece having an opening within which said centralizer body slidably is disposed, a part of said centralizer body extending into said channel and having a groove to accept fasteners from the fastener feeding device and locate the fasteners directly in the path of travel of said blade, said centralizer being freely floating in said opening, a spring reacting on said centralizer body and urging said centralizer body inwardly of said channel, means for limiting the extent of penetration of said centralizer body into said channel, and the part of said centralizer body that is located in said channel having a cam surface over which a part of the fastener is propelled by said blade and over which the leading edge of said blade is passed during a driving stroke of the blade.

10. The fastener driver of claim 9 wherein said centralizer is interchangeable end for end in said opening.

References Cited in the file of this patent

UNITED STATES PATENTS

| | | |
|---|---|---|
| 420,074 | Jones | Jan. 28, 1890 |
| 462,848 | McCornack | Nov. 10, 1891 |
| 999,327 | McFreely | Aug. 1, 1911 |
| 1,634,226 | Alibert | June 28, 1927 |
| 2,300,277 | Hansen | Oct. 27, 1942 |